C. W. UNGER.
FISHING REEL ATTACHMENT.
APPLICATION FILED JULY 14, 1908.
932,837.
Patented Aug. 31, 1909.
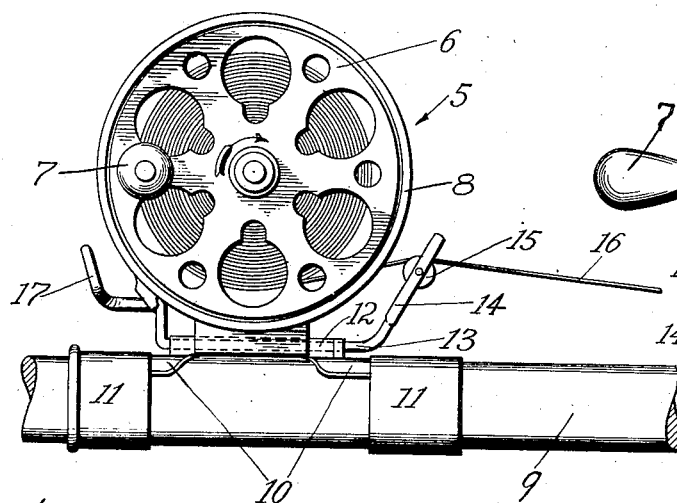
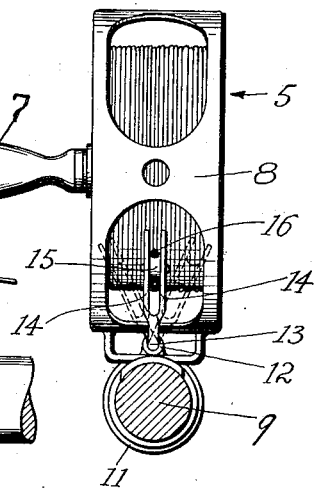
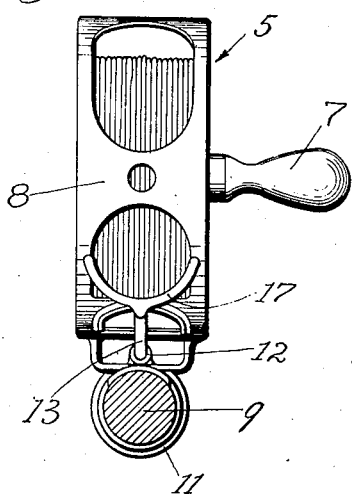
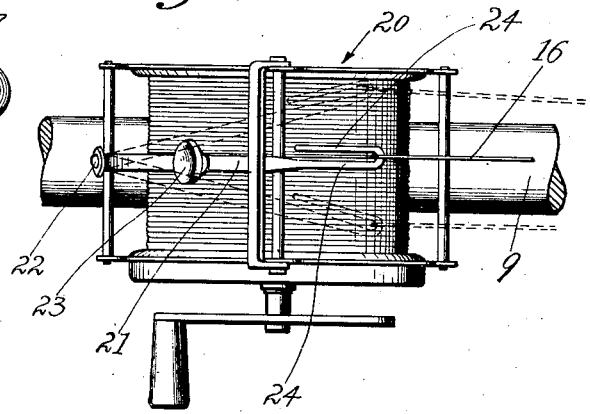
Witnesses
Rudolf Wildenhayn
James T. Barkelew
Inventor
Charles W. Unger.
Hazard & Krause.
Attorneys.

UNITED STATES PATENT OFFICE.

CHARLES W. UNGER, OF LOS ANGELES, CALIFORNIA.

FISHING-REEL ATTACHMENT.

932,837.  Specification of Letters Patent.  Patented Aug. 31, 1909.

Application filed July 14, 1908. Serial No. 443,424.

*To all whom it may concern:*

Be it known that I, CHARLES W. UNGER, a citizen of the United States, residing at Los Angeles, in the county of Los Angeles and State of California, have invented new and useful Improvements in Fishing-Reel Attachments, of which the following is a specification.

This invention relates to a means for smoothly and evenly coiling a fishing line upon a fishing reel.

In the accompanying drawings, forming a part of this specification:—Figure 1,— is a side elevation of a reel supplied with the attachment. Fig. 2,— is a front end elevation of the same. Fig. 3,— is a rear end elevation of the same. Fig. 4,— is a plan view of a modified form of attachment adapted for use in connection with a different form of reel.

In the drawings 5 designates a reel of standard construction having a revoluble winding member 6 provided with a handle 7 and stationary frame 8 which is mounted on fishing rod 9 by means of rod clips 10 and ferrules 11. At the lower part of frame 8 a journal bearing 12 is provided which extends longitudinally of the reel from its front side to its rear side. Mounted in bearing 12 is a rock shaft 13 which is bent upwardly at its forward end and is bifurcated, the two arms 14 carrying between them a small sheave or roller 15. Line 16 is adapted to pass over sheave 15 being held against accidental removal therefrom by means of arm 14 on both sides of the sheave. Line 16 passes from sheave 15 to revoluble member 6 of the reel as shown in Fig. 1, the revoluble member being rotated in the direction indicated by the arrow for the purpose of winding the line up.

On the rear end of shaft 13, the end of the shaft being bent up as shown in Fig. 1 to a convenient position above the fishing rod 9, a thumb piece 17 is formed in a somewhat semicircular configuration. The reel is placed on the fishing rod with this thumb piece toward the handle of the rod so that the thumb of the angler may be placed upon the thumb piece. Sheave 15 and arms 14 together form a guide for line 16 and it will be seen that by moving thumb piece 17 from one side to the other the line may be coiled evenly upon the reel so that it does not become tangled during a quick winding.

In Fig. 4 I have shown a modified form of guide adapted especially for the standard form of reel 20 shown in that figure. The guide is formed of a rod or strap 21 pivoted at 22 to the reel and carrying a button 23 which may be engaged by the thumb. The forward end of rod 21 is bent upon itself as at 24 to form a loop through which the line passes as illustrated. By moving button 23 from side to side the line may be coiled evenly upon a reel as in the form first described. It will be understood that the simplicity of the guide enables it to be attached to any form of reel, the above described forms being merely typical.

Having described my invention what I claim as new and desire to secure by Letters Patent is:—

In a fishing reel, a line reel and frame therefor, said frame provided with rod attaching means, a longitudinally extending shaft bearing forming a part of said reel frame, a rock shaft journaled in said bearing, one of its ends being bifurcated to form a bearing, and a grooved roller journaled therein, the other end being formed into a thumb or finger piece, whereby the rock shaft may be oscillated.

In witness that I claim the foregoing I have hereunto subscribed my name this 7th day of July, 1908.

CHAS. W. UNGER.

Witnesses:
  JAMES T. BARKELEW,
  OLLIE PALMER.